US010346055B2

(12) United States Patent
Jin

(10) Patent No.: US 10,346,055 B2
(45) Date of Patent: Jul. 9, 2019

(54) RUN-TIME MEMORY ACCESS UNIFORMITY CHECKING

(71) Applicant: Advanced Micro Devices, Inc., Sunnyvale, CA (US)

(72) Inventor: Guohua Jin, Acton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 161 days.

(21) Appl. No.: 15/663,103

(22) Filed: Jul. 28, 2017

(65) Prior Publication Data

US 2019/0034093 A1 Jan. 31, 2019

(51) Int. Cl.
*G06F 9/30* (2018.01)
*G06F 3/06* (2006.01)
*G06F 13/16* (2006.01)
*G06F 9/50* (2006.01)

(52) U.S. Cl.
CPC .......... *G06F 3/0611* (2013.01); *G06F 9/5094* (2013.01); *G06F 13/1631* (2013.01); *G06F 13/1663* (2013.01)

(58) Field of Classification Search
CPC .. G06F 9/5094; G06F 3/0611; G06F 13/1631; G06F 13/1663
See application file for complete search history.

(56) References Cited

U.S. PATENT DOCUMENTS

| | | | |
|---|---|---|---|
| 2006/0179426 A1* | 8/2006 | Koo | G06F 8/51 717/140 |
| 2013/0067196 A1* | 3/2013 | Michalak | G06F 9/3017 712/7 |
| 2014/0237460 A1* | 8/2014 | Schmidt | G06F 8/443 717/160 |
| 2014/0366033 A1* | 12/2014 | Nystad | G06F 9/50 718/104 |
| 2015/0242210 A1* | 8/2015 | Kim | G06F 9/30036 712/7 |
| 2016/0357551 A1* | 12/2016 | Wood | G06F 9/3004 |
| 2017/0242696 A1* | 8/2017 | Kidd | G06F 9/30105 |
| 2018/0121386 A1* | 5/2018 | Chen | G06F 9/3887 |

* cited by examiner

*Primary Examiner* — Ryan Bertram
(74) *Attorney, Agent, or Firm* — Meyertons Hood Kivlin Kowert and Goetzel PC; Rory D. Rankin

(57) ABSTRACT

Systems, apparatuses, and methods for performing run-time checking of access uniformity of vector memory access instructions are disclosed. A system includes a vector unit, a scalar unit, and a memory. The system performs a run-time check to determine if two or more threads of a wave have access uniformity to the memory prior to executing a vector memory access instruction for the wave on the vector unit. The system replaces the vector memory access instruction with a group of instructions responsive to determining that two or more threads of the wave have access uniformity to the memory. The group of instructions includes a scalar access instruction to memory followed by a cross-thread data sharing instruction. The scalar access instruction is executed on the scalar unit. Alternatively, the group of instructions can include a vector memory access instruction by only a single thread in each group having access uniformity.

20 Claims, 8 Drawing Sheets

RUN-TIME MEMORY ACCESS UNIFORMITY CHECKING

BACKGROUND

Description of the Related Art

Many types of modern microprocessors support Single Instruction Multiple Data (SIMD) instructions. A SIMD instruction performs the same identical action simultaneously on two or more pieces of data on separate lanes of a vector execution unit. There are different ways to utilize the SIMD capabilities of a microprocessor. Vectorization of a program allows performance speedup of the application by leveraging the SIMD capabilities of modern microprocessors. However, efficient vectorization is severely inhibited in cases where there is contention by multiple threads accessing the same locations in off-chip memory. A group of threads that execute the same instruction(s) in lock-step on a plurality of SIMD lanes are referred to as a "wavefront" or a "wave" herein.

Today's parallel processors are increasingly limited by memory bandwidth. In some applications, it is common for multiple threads within the same wave to access the same memory location. In these cases, the contention for the same memory location slows down execution of the wave as the threads compete for memory bandwidth or wait for other threads to finish the access. In one embodiment, off-chip memory data may be accessed by vector load instructions of the following format:

buffer_load vdata,vaddr,soffset,srsrc,offset

Additionally, in this embodiment, off-chip memory data is accessed by vector store instructions of the following format:

buffer_store vdata,vaddr,soffset,srsrc,offset

For the above instructions, "vdata" and "vaddr" are vector registers, and "soffset" and "srsrc" are scalar registers. Each thread loads from or stores to a location of off-chip memory its data "vdata" using its thread offset in "vaddr" along with a common base address from "srsrc" and offsets "soffset" and "offset" for the wave. The memory address is calculated as:

address=base($srsrc$)+sgpr_offset($soffset$)+buffer_offset where "buffer_offset" is calculated as buffer_offset=inst_offset(offset)+vgpr_offset($vaddr$)

Ideally different threads in a wave access different locations of memory. However, this is often not true in practice. When multiple threads in a wave access the same location in memory, these accesses are referred to as being uniform within the set of threads. Uniformity can be defined at different levels as follows. Assume a wave has "n" threads, a quad "q" of 4 threads within a wave includes threads $4*q$ to $4*q+3$. A memory access is referred to as uniform in a quad q if vaddr(i)=vaddr(j) (for some q and all threads i and j in a wave, $4*q \leq i, j \leq 4*q+3$), and uniform in a wave if vaddr(i)=vaddr(j) (for all threads i and j in a wave, $0 \leq i, j \leq n-1$), where vaddr(i) represents the value of vector register "vaddr" in thread "i". Similarly, access uniformity can be defined at a level between a quad and a wave. If every thread in a group of threads accesses the same memory location to read or write the same data, memory bandwidth is not effectively utilized.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
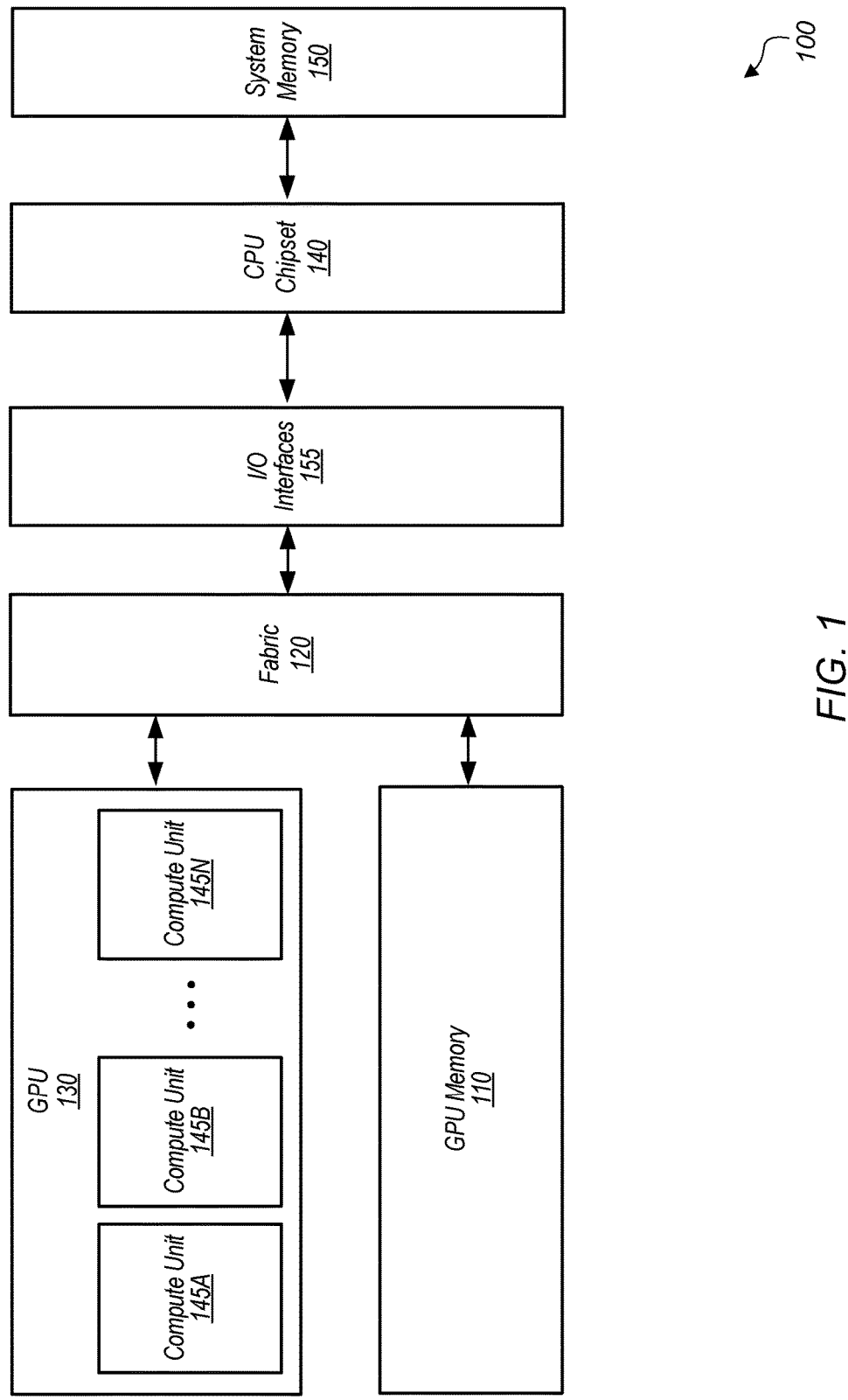
FIG. 1 is a block diagram of one embodiment of a computer system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for detecting run-time access uniformity in threads of a wave are disclosed herein. A computing system includes at least a vector execution unit, a scalar execution unit, and a memory. The system performs a run-time check to determine if two or more threads of a wave have access uniformity to the memory prior to executing a vector memory access instruction for the wave on the vector execution unit. In one embodiment, the system executes a group of instructions in place of the vector memory access instruction responsive to determining that two or more threads of the wave have access uniformity to the memory. The group of instructions include a scalar access instruction to memory and if necessary, a cross-thread data sharing instruction. The scalar access instruction is executed on the scalar execution unit. Alternatively, rather than a scalar access instruction to memory, the group of instructions can include a vector memory access instruction performed by a single thread in each group of threads having access uniformity. It is noted that the vector memory access instruction can be a vector store instruction to memory or a vector load instruction from memory.

In one embodiment, a compiler receives, as input, a sequence of instructions of program code targeting a computing system with a vector execution unit, a scalar execution unit, and one or more off-chip memory devices. When the compiler detects, in the sequence of instructions, a vector memory access instruction to off-chip memory, the compiler determines if the vector memory access instruction satisfies one or more conditions. In one embodiment, a condition of the one or more conditions is the probability of the vector memory access instruction having access uniformity being greater than a threshold. As used herein, the term "access uniformity" is defined as two or more threads of a wave accessing the same location in off-chip memory. In some cases, access uniformity can only be detected at run-time, and so the compiler generates a prediction of whether the given vector memory access instruction will have access uniformity. Then, the compiler compares this prediction to a programmable threshold. In another embodiment, a condition of the one or more conditions is the vector memory access instruction accessing patch constant or control point data as part of a domain shader. In other embodiments, the one or more conditions can include other types of conditions.

In one embodiment, if the vector memory access instruction satisfies a condition of the one or more conditions, the compiler replaces the vector memory access instruction with a plurality of instructions. In one embodiment, the plurality of instructions make the vector memory access instruction conditional on whether access uniformity is detected at run-time. In one embodiment, access uniformity is detected at run-time if two or more threads in a wave access a same location in memory. In another embodiment, access uniformity is detected at run-time if a threshold number of threads in a wave access a same location in memory.

In one embodiment, the plurality of instructions include one or more first instructions to determine, at run-time, if the vector memory access instruction has access uniformity for two or more threads of the wave. In one embodiment, the first plurality of instructions also include a second instruction to perform a scalar memory access in place of the vector memory access and a third instruction to perform a cross-thread data sharing of the results of the scalar access with a plurality of threads responsive to determining that the vector memory access instruction has access uniformity. In another embodiment, if memory access is uniform for a group of threads within a wave, what is performed instead is to have one thread in each uniform group issue a vector access instruction followed by an instruction to share the fetched data if the access is a memory load. If access uniformity is not detected for the vector memory access instruction, then the original vector memory access instruction is executed.

Referring now to FIG. 1, a block diagram of one embodiment of a computing system 100 is shown. In one embodiment, computing system 100 includes a system memory 150, input/output (I/O) interfaces 155, fabric 120, graphics processing unit (GPU) 130, GPU memory 110, and CPU Chipset 140. System 100 can also include other components not shown in FIG. 1 to avoid obscuring the figure. In another embodiment, GPU 130 can be another type of processing unit (e.g., application specific integrated circuit (ASIC), field programmable gate array (FPGA), digital signal processor (DSP)). Additionally, it should be understood that other types of computing systems with different structures and/or containing other components can be utilized to implement the various methods and mechanisms described herein.

GPU 130 includes at least compute units 145A-N which are representative of any number and type of compute units that are used for graphics or general-purpose processing. Each compute unit 145A-N includes any number of execution units, with the number of execution units varying from embodiment to embodiment. GPU 130 is coupled to GPU memory 110 via fabric 120. In one embodiment, GPU memory 110 is implemented using high-bandwidth memory (HBM). In one embodiment, GPU memory 110 stores vertex data, control points, patch constants, as well as other data.

In one embodiment, GPU 130 is configured to execute graphics pipeline operations such as draw commands, pixel operations, geometric computations, and other operations for rendering an image to a display. In another embodiment, GPU 130 is configured to execute operations unrelated to graphics. In a further embodiment, GPU 130 is configured to execute both graphics operations and non-graphics related operations.

In one embodiment, GPU 130 is configured to perform a run-time check to determine if multiple threads of a wave access the same location in memory (e.g., GPU memory 110, system memory 150) prior to executing a vector memory access instruction for the wave. In one embodiment, when multiple threads in a wave have the same value in the vector register "vaddr", the multiple threads access the same location in memory, and their accesses are referred to as uniform within the set of threads. In other words, the term "access uniformity" refers to multiple threads in a wave accessing the same location in memory. In one embodiment, access uniformity is detected by observing the same value in the vector register "vaddr" for multiple different threads. In one embodiment, GPU 130 replaces the vector memory access instruction with a group of instructions responsive to determining that multiple different threads of the wave have the same value in the vector register "vaddr". In one embodiment, the group of instructions includes a scalar access instruction to memory followed by a cross-thread data sharing instruction if the access is a load. In another embodiment, the group of instructions includes a vector access instruction to memory by a thread of the uniform group followed by a cross-thread data sharing instruction if the access is a load.

In one embodiment, GPU 130 checks the memory offset of vector loads and stores across multiple threads to identify multiple levels of access uniformity. In this embodiment, GPU 130 checks for access uniformity at a first level (e.g., 64 threads), then at a second level (e.g., 32 threads), then at a third level (e.g., 16 threads), and so on. If GPU 130 detects access uniformity at a given level, GPU 130 replaces the vector access with either a scalar load or store or with a vector load or store issued by fewer threads in combination with cross-thread data sharing, if necessary, to improve effective memory bandwidth. In one embodiment, GPU 130 applies this approach to domain shaders for fetching off-chip control point and patch constant data. A domain shader reads control points and patch constants that are computed for each patch by a hull shader in a tessellation pipeline. Threads working on domain points in the same patch share the same control points and patch constants. By letting only one thread in a uniform group fetch data from memory, GPU 130 avoids having multiple threads repeatedly fetching the same data from the same memory location. The approach is also applicable to other cases of memory access in other types of shaders.

I/O interfaces 155 are coupled to fabric 120, and I/O interfaces 155 are representative of any number and type of interfaces (e.g., peripheral component interface (PCI) bus, PCI-Extended (PCI-X), PCIE (PCI Express) bus, gigabit Ethernet (GBE) bus, universal serial bus (USB)). CPU chipset 140 is coupled to system memory 150, which includes one or more memory modules. Each of the memory modules includes one or more memory devices mounted thereon. In some embodiments, system memory 150 includes one or more memory devices mounted on a motherboard or other carrier upon which GPU 130 and/or other components are also mounted. In these embodiments, system memory 150 is on a separate chip from GPU 130, and system memory 150 can be referred to as "off-chip memory". Accordingly, accesses to off-chip system memory 150 will have higher latency and increased power consumption as compared to accesses to caches within GPU 130 or accesses to GPU memory 110.

In various embodiments, computing system 100 can be a computer, laptop, mobile device, server or any of various other types of computing systems or devices. It is noted that the number of components of computing system 100 and/or GPU 130 can vary from embodiment to embodiment. There can be more or fewer of each component/subcomponent than the number shown in FIG. 1. It is also noted that computing system 100 and/or GPU 130 can include other components not shown in FIG. 1. For example, in another embodiment, GPU 130 can represent a multicore processor. Additionally, in other embodiments, computing system 100 and GPU 130 can be structured in other ways than shown in FIG. 1.

Figure 2:
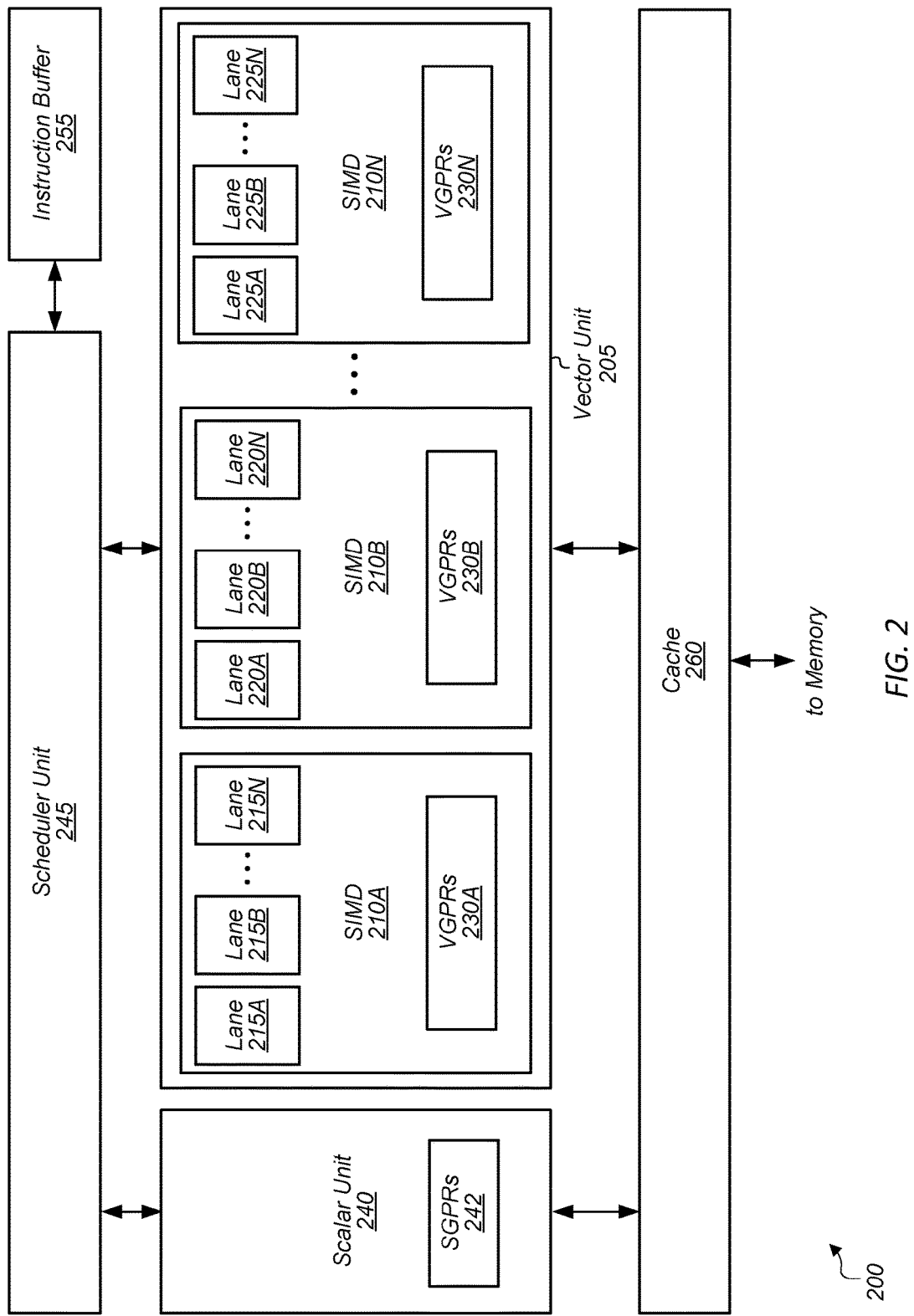
FIG. 2 is a block diagram of one embodiment of a compute unit.

Turning now to FIG. 2, a block diagram of one embodiment of a compute unit 200 is shown. In one embodiment, compute unit 200 includes at least vector unit 205, scalar unit 240, scheduler unit 245, instruction buffer 255, and cache 260. Scheduler unit 245 is configured to schedule instructions retrieved from instruction buffer 255 on vector unit 205 and/or scalar unit 240. Cache 260 is representative of any number and type of caches, and these cache(s) can be located at various locations within compute unit 200 rather than being implemented as a single cache as shown in FIG. 2. It is noted that compute unit 200 can also include other logic which is not shown in FIG. 2 to avoid obscuring the figure. In one embodiment, each compute unit 145A-N (of FIG. 1) of GPU 130 includes the circuitry of compute unit 200. It is also noted that other processors (e.g., FPGAs, ASICs, DSPs) can include the circuitry shown in compute unit 200.

In one embodiment, scalar unit 240 is configured to execute scalar instructions while vector unit 205 is configured to execute vector instructions. The scalar instructions include scalar memory access instructions and the vector instructions include vector memory access instructions. A memory access instruction can be a store instruction or a load instruction targeting a location in GPU memory 110 or system memory 150 of FIG. 1. Scalar unit 240 includes scalar general purpose registers (SGPRs) 242 while vector unit 205 includes vector general purpose registers (VGPRs) 230A-N. In one embodiment, threads in a wave have separate copies of each vector register, but the threads of the wave share the same set of scalar registers.

It is noted that scalar unit 240 can also be referred to as a scalar execution unit and that vector unit 205 can also be referred to as a vector execution unit. Scalar unit 240 includes a scalar pipeline for executing scalar instructions while vector unit 205 includes a plurality of execution pipelines (i.e., lanes 215A-N, 220A-N, and 225A-N) for executing vector instructions. In one embodiment, the scalar pipeline of scalar unit 240 is shorter than the execution pipelines of vector unit 205.

In one embodiment, compute unit 200 is configured to process instructions of a shader program on wavefronts of multiple threads. Each thread of a wavefront (or wave) can execute on a corresponding lane of lanes 215A-N, 220A-N, and 225A-N in single instruction, multiple data units (SIMDs) 210A-N. Each lane 215A-N, 220A-N, and 225A-N of SIMDs 210A-N can also be referred to as an "execution unit". It is noted that SIMDs 210A-N are representative of any number of SIMDs and lanes 215A-N, 220A-N, and 225A-N are representative of any number of lanes, with the numbers of SIMDs and the numbers of lanes varying from embodiment to embodiment.

In one embodiment, compute unit 200 is configured to perform a run-time check to determine if multiple threads of a wave have access uniformity to the memory for a vector memory access instruction prior to executing the vector memory access instruction on vector unit 205. In one embodiment, compute unit 200 replaces the vector memory access instruction with a group of instructions responsive to determining that multiple threads of the wave have access uniformity to the memory. In one embodiment, the group of instructions includes a scalar access instruction to memory followed by a cross-thread data sharing instruction if the access is a load. The scalar access instruction is executed on a scalar unit 240. In another embodiment, the group of instructions includes a vector access instruction to memory by a thread of the uniform group followed by a cross-thread data sharing instruction if the access is a load.

In one embodiment, optimal order of access uniformity checking at different levels is determined by multiple factors including probability of access uniformity at the levels, the impact of improved memory bandwidth utilization on performance, and the cost of data access and run-time checking. This can be different for different applications (e.g., video games), the same application with different settings or the same application at different pipeline stages. In one embodiment, in order to reduce the cost of run-time checking, multiple data accesses can be combined if they share the same access uniformity. For example, when multiple control point and patch constant data fetches are performed by a domain shader, a single run-time check can be performed for these multiple control point and patch constant data fetches. By combining multiple run-time checks, the cost of run-time checking is reduced and multiple memory access instructions can potentially be merged. For example 4 memory double word (dword) loads of consecutive memory locations can be merged into a single memory load of 4 dwords.

It is noted that the letter "N" when displayed herein next to various structures is meant to generically indicate any number of elements for that structure (e.g., any number of SIMDs 210A-N). Additionally, different references within FIG. 2 that use the letter "N" (e.g., SIMDs 210A-N and lanes 215A-N) are not intended to indicate that equal numbers of the different elements are provided (e.g., the number of SIMDs 210A-N can differ from the number of lanes 215A-N).

Figure 3:
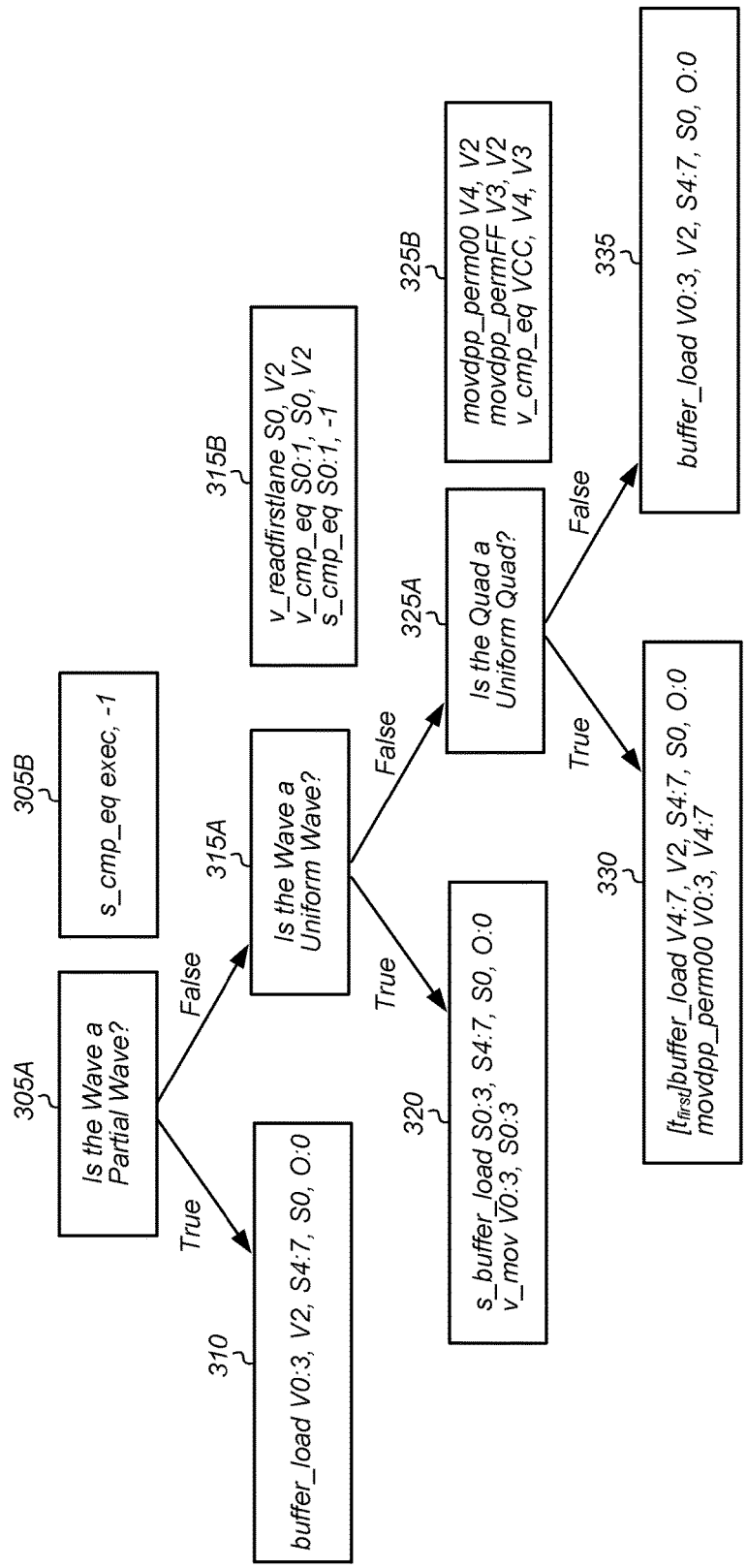
FIG. 3 is a diagram of one embodiment of performing run-time memory access uniformity checking.

Referring now to FIG. 3, a diagram of one embodiment of performing run-time access uniformity checking is shown. In block 305A, a compute unit (e.g., compute unit 200 of FIG. 2) determines if the wave of threads being executed on the compute unit is a partial wave. Depending on the embodiment, the number of threads per wave can vary. For example, in one embodiment, a wave has 64 threads. In other embodiments, a wave can have other numbers of threads. If the wave is a partial wave, this indicates that not all of the threads of the wave are active for a given instruction. Block 305B illustrates an instruction that is utilized to perform the determination step of block 305A for one particular embodiment. In other embodiments, other instructions can be utilized to perform the determination step of block 305A. If the wave is a partial wave (following the true branch out of block 305A), then a vector load instruction is executed as shown in block 310 to load data from memory for the active threads. Block 310 shows one example of an instruction that can be executed to implement the vector load from memory. In other embodiments, other instructions can be executed to perform the vector load from memory. Similarly, for the other instructions shown in FIG. 3, it should be understood that these instructions are examples that can be executed in one particular embodiment. In other embodiments, other suitable instructions can be utilized.

If the wave is a full wave (following the false branch out of block 305A), then the compute unit determines if the wave is a uniform wave in block 315A. As used herein, the term "uniform wave" is defined as a wave where each thread in the wave has the same offset into memory. In other words, each thread of a uniform wave will be accessing the same memory location. In one embodiment, the instructions shown in block 315B are executed to determine if the wave is a uniform wave. In other embodiments, other instructions can be executed to determine if the wave is uniform wave.

As shown in block 315B, the first instruction reads the value of the V2 register as vgpr offset from the first lane of the vector unit and stores the value in the scalar register S0. In other embodiments, the first instruction can read the value of the V2 register from other lanes of the vector unit. Next, a vector compare instruction is executed to compare the value in scalar register S0 to the value in each thread's V2 register. Then, a scalar compare instruction is executed to see if all threads have the same value in the V2 register as the first lane's V2 register. Accordingly, the result of the scalar compare instruction will indicate whether or not the wave is a uniform wave. It is noted that another suitable sequence of instructions (different from the instructions shown in block 315B) can be utilized in another embodiment.

Accordingly, if the wave is a uniform wave (following the true branch out of block 315A), then the compute unit performs a scalar buffer load to load data from the off-chip memory at the shared offset into a scalar register of the scalar unit. Using a scalar buffer load for a uniform wave not only improves effective memory bandwidth but also reduces memory latency and saves power by taking a simpler and shorter hardware path in the scalar execution unit as compared to the vector execution unit. After the scalar buffer load, a vector move instruction is executed to share the retrieved data in the scalar register with the vector registers of the threads of the wave. The scalar buffer load instruction followed by the vector move instruction shown in block 320 is a more efficient implementation than performing the original vector buffer load instruction to the same off-chip memory location by all of the threads of the wave.

If the wave is not a uniform wave (following the false branch out of block 315A), then the compute unit determines if the wave includes a uniform quad as shown in block 325A. It is noted that a uniform quad refers to a uniformity of access by four adjacent threads of the wave. In other embodiments, the system can determine if the wave has uniformity among other numbers of threads besides four. For example, in other embodiments, the system can determine if there are 32 uniform threads, 16 uniform threads, 8 uniform threads, or other numbers of uniform threads in block 325A.

If the wave includes a uniform quad (following the true branch out of block 325A), then in one embodiment, the instructions shown in block 330 are executed to load the data from off-chip memory by the first thread of the quad and then share the data with the other threads of the uniform quad. In one embodiment, the instructions shown in block 325B are performed to determine if the wave includes a uniform quad. As shown in block 325B, a data parallel primitive move instruction is performed to load the value of the V2 register of the first thread in each quad into the V4 register of all threads in the quad. Then, a data parallel primitive move instruction is performed to move the value of a fourth thread's V2 register into the V3 register of all threads in the quad. Then, each thread compares the values of its V4 register and V3 register to see if they are equal. If the values of the V4 register and the V3 register are equal, then the compute unit concludes that the first, second, third, and fourth threads are a uniform quad.

If the wave includes a uniform quad, then following the true branch out of block 325A, a buffer load instruction is executed by the first thread in the uniform quad as shown in block 330 to load the data from off-chip memory into its vector registers as shown in block 330. Then, a data parallel primitive instruction is executed to move the loaded data into the vector registers of the other threads of the quad. In non-uniform quads, all threads follow the false branch and execute a vector buffer load to load the data from the off-chip memory into their vector registers as shown in block 335.

Figure 4:
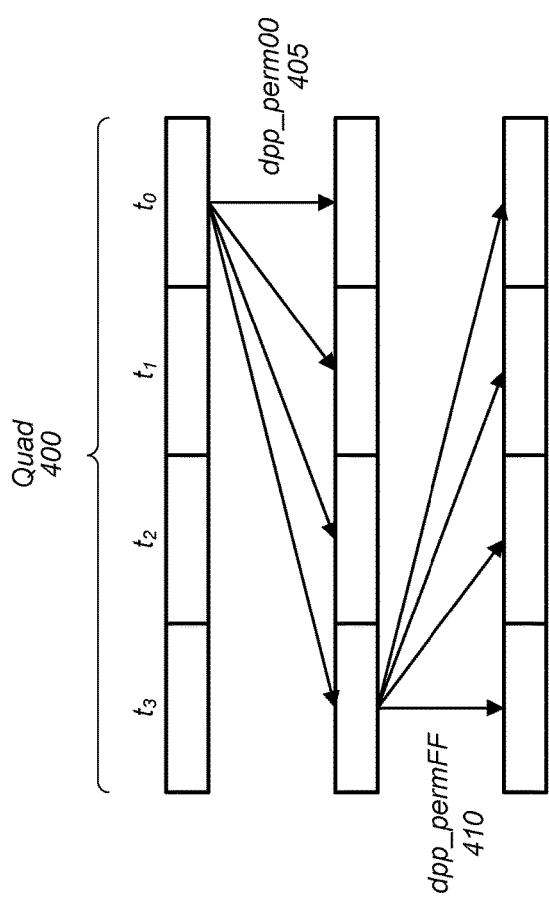
FIG. 4 is a diagram of one embodiment of cross-lane data access using data parallel primitive instructions.

Turning now to FIG. 4, a diagram of one embodiment of cross-lane data access using data parallel primitive instructions is shown. An example of a quad 400 for four separate threads $t_{0-3}$ is shown in FIG. 4. It is noted that in other embodiments, other numbers of threads, besides four, can be a group for checking access uniformity. For instruction 405 "dpp_perm00", all four threads in a quad access data from a vector register of the first thread for a vector operation. Instruction 405 is utilized to transfer data from the first thread to all four threads in the group. In one embodiment, a quad 400 is a group of threads being checked for access uniformity for a given vector memory access instruction, with the four threads $t_0$, $t_1$, $t_2$, and $t_3$ representative of the four threads of the quad. If a quad is found to be uniform, rather than having all four threads read data from the same location in off-chip memory, a single thread to reads data from this location in off-chip memory. Then, data is copied to all of the threads in the quad.

In another embodiment, instruction 410 "dpp_permFF" is executed to allow all threads of the quad to access the value of a vector register of thread $t_3$. In this embodiment, instruction 410 can be used for accessing data from thread $t_3$ for checking uniformity of a quad or it can be used for thread $t_3$ to copy data to other threads in the quad 400 after it reads data from a location of off-chip memory which is targeted by loads from all thread in the quad.

Figure 5:
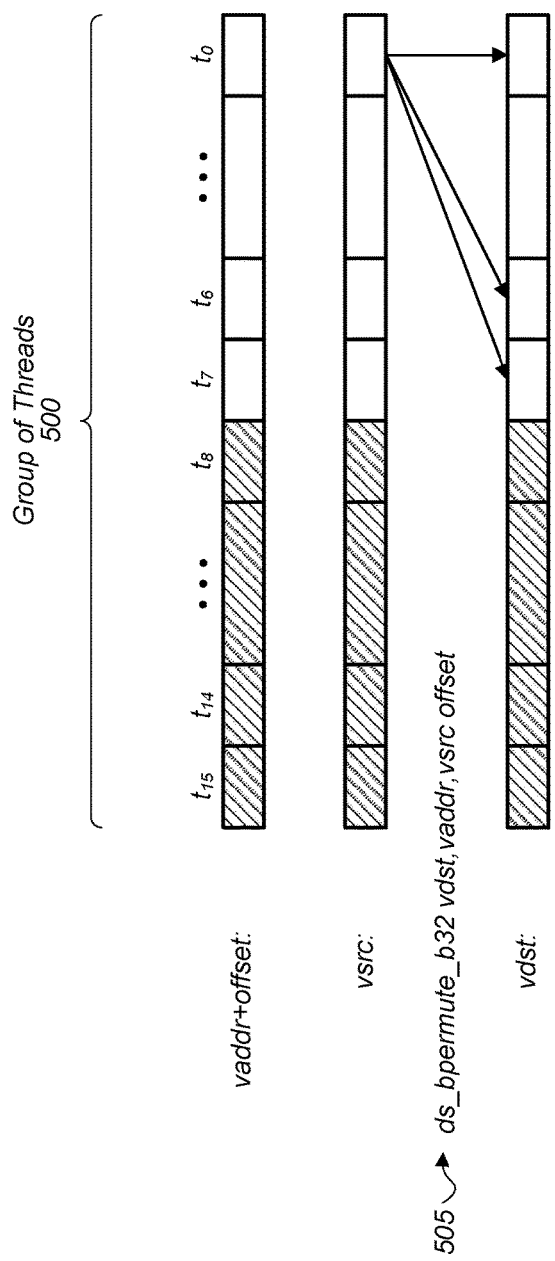
FIG. 5 is a diagram of one embodiment of broadcasting data from any thread to others in a group of threads.

Referring now to FIG. 5, a diagram of one embodiment of broadcasting data from any thread to others in a group of threads 500 is shown. In one embodiment, a vector unit broadcasts data from one thread to others in a group of threads 500. In one embodiment, for broadcasting data from any thread to others in a group of 4, 8, 16, 32, or other number of threads, a data share (DS) permute "ds_bpermute" instruction 505 can be utilized to pull a value from a thread expressed by "vaddr+offset". In one embodiment, data share permute instructions use local data share (LDS) hardware to route data in a wave but these instructions do not actually write to an LDS location. In one embodiment, data in all inactive threads will not be overwritten. In the example shown in FIG. 5, instruction 505 is executed to broadcast data from thread 0 to the group of the first 8 threads while leaving values in thread 8-15 unchanged by marking them inactive in the execution mask. Threads 8-15 are shown with the dashed lines in FIG. 5 to indicate that these threads are inactive, while threads 0-7 are shown as clear blocks to indicate that these threads are active.

Figure 6:
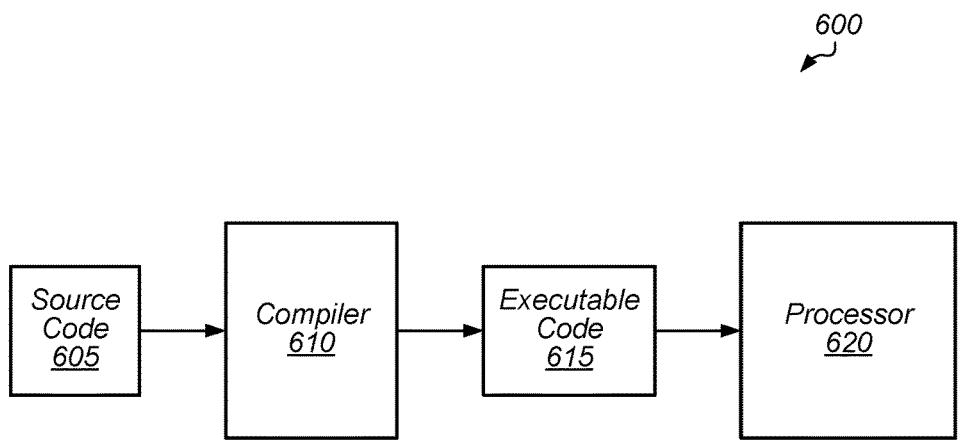
FIG. 6 is a block diagram of one embodiment of a computing environment.

Turning now to FIG. 6, a block diagram of one embodiment of a computing environment 600 is shown. Computing environment 600 includes a compiler 610 and processor 620. Processor 620 is representative of any number and type of processors. In one embodiment, processor 620 is a GPU (e.g., GPU 130 of FIG. 1). Compiler 610 is configured to compile source code 605 into executable code 615 which is executable by processor 620. In one embodiment, processor 620 includes one or more single instruction multiple data (SIMD) units for operating on data in parallel. Compiler 610 is configured to optimize executable code 615 to target the SIMD units of processor 620.

In one embodiment, compiler 610 determines that a portion of source code 605 is a domain shader. The compiler can also determine that the data being accessed in the portion of source code 605 is patch constant or control point data through a declaration. For example, patch constant or control point variables can be declared in the inputs in the portion of source code 605. Accordingly, in response to detecting that the portion of source code 605 is accessing patch constant or control point data as part of a domain shader, compiler 610 inserts a run-time checking instruction in the portion of source code 605 for a given vector memory access instruction to check for access uniformity at run-time. Alternatively, compiler 610 can insert a single run-time checking instruction in the portion of source code 605 for multiple vector memory access instructions to check for access uniformity of these multiple instruction. If a run-time check determines that the given vector memory access instruction in the portion of source code 605 has access uniformity, then in one embodiment, the given vector memory access instruction is replaced by a scalar memory access instruction and if necessary, a cross-thread data sharing instruction. In another embodiment, the given vector memory access instruction is replaced by a vector memory access instruction performed by fewer threads and if necessary, a cross-thread data sharing instruction.

Figure 7:
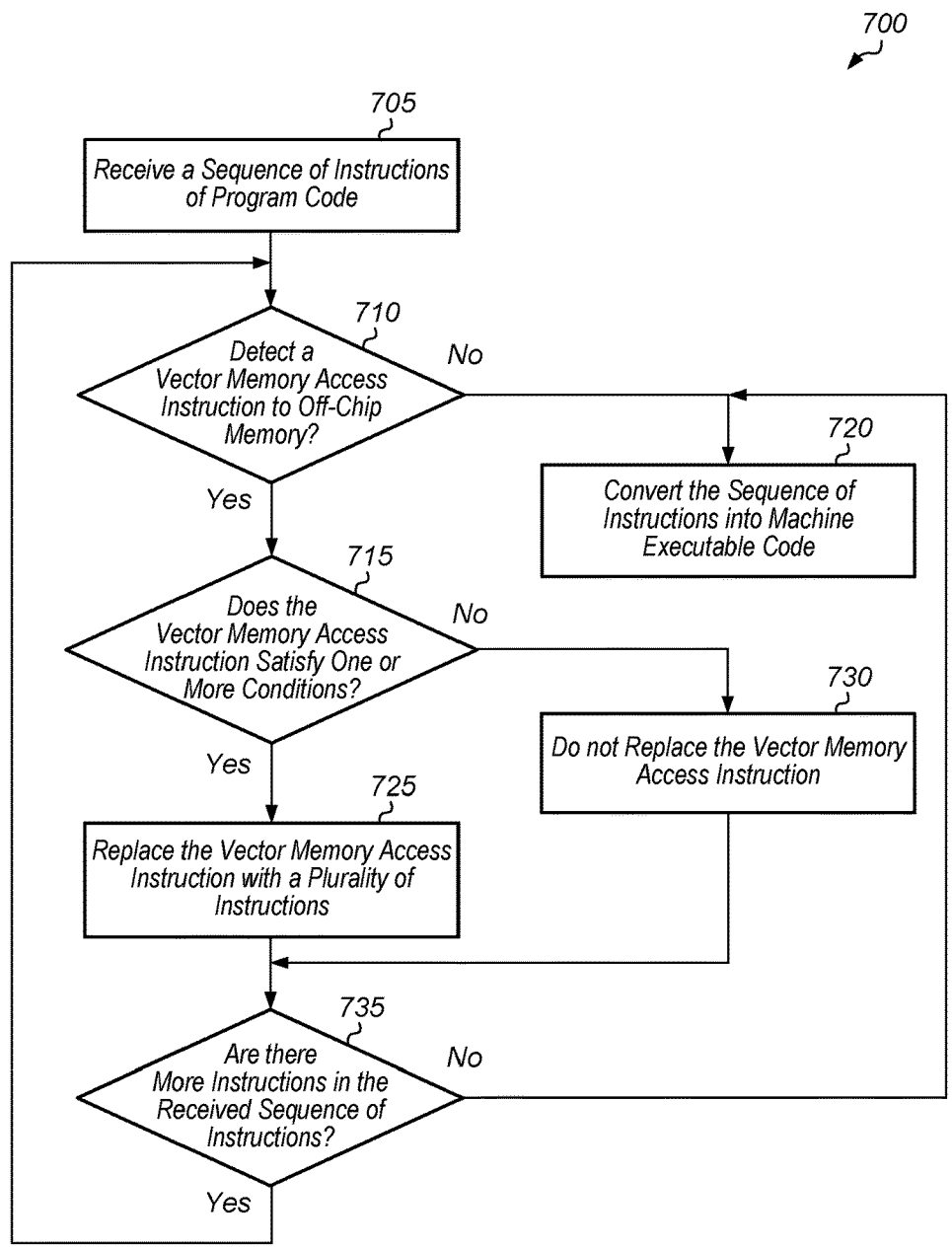
FIG. 7 is a generalized flow diagram illustrating one embodiment of a method for generating instructions to perform run-time checking of access uniformity in vector memory access instructions.
Figure 8:
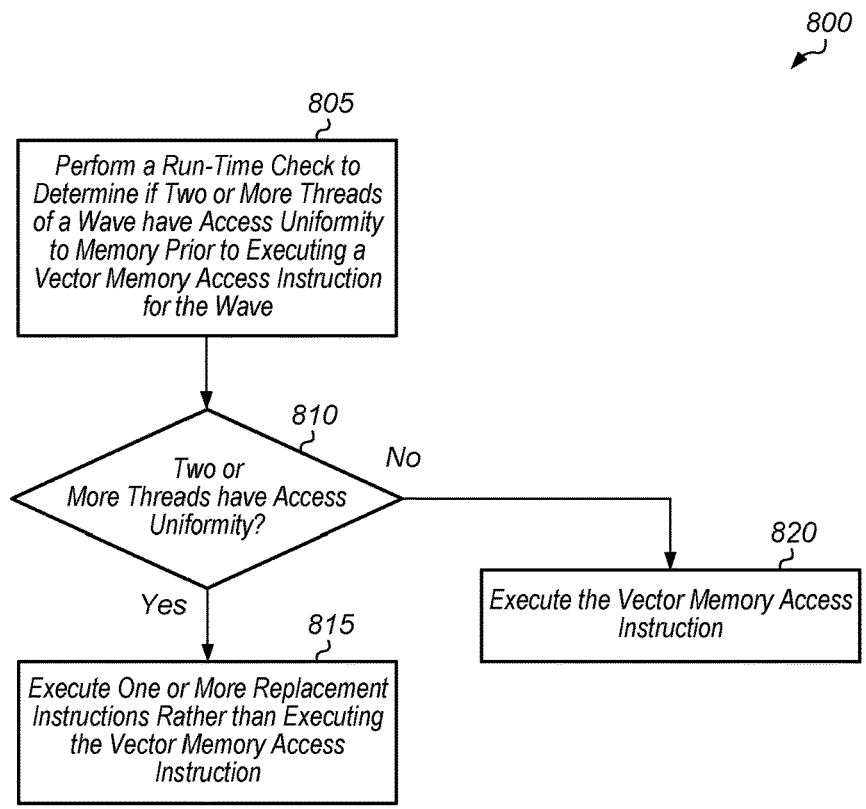
FIG. 8 is a generalized flow diagram illustrating one embodiment of a method for performing run-time checking of access uniformity of vector memory access instructions.

Referring now to FIG. 7, one embodiment of a method 700 for generating instructions to perform run-time checking of access uniformity in vector memory access instructions is shown. For purposes of discussion, the steps in this embodiment and those of FIG. 8 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 700.

A compiler (e.g., compiler 610 of FIG. 6) receives a sequence of instructions of input program code (block 705). If the compiler detects, in the sequence of instructions, a vector memory access instruction to off-chip memory (conditional block 710, "yes" branch), then the compiler determines if the vector memory access instruction satisfies one or more conditions (conditional block 715). If the compiler does not detect a vector memory access instruction (conditional block 710, "no" branch), then the compiler converts the sequence of instructions into machine executable code (block 720). In one embodiment, a condition of the one or more conditions is the compiler predicting that the vector memory access instruction will have access uniformity. For example, the compiler can determine that the probability of the vector memory access instruction having access uniformity is greater than some threshold. In another embodiment, a condition of the one or more conditions is the vector memory access instruction accessing patch constant or control point data as part of a domain shader. In other embodiments, the one or more conditions can include other types of conditions.

If the vector memory access instruction satisfies the one or more conditions (conditional block 715, "yes" branch), then the compiler replaces the vector memory access instruction with a plurality of instructions (block 725). In one embodiment, the plurality of instructions cause the vector memory access instruction to be conditional on whether access uniformity is detected at run-time. In one embodiment, the plurality of instructions include one or more first instructions to determine, at run-time, if the vector memory access instruction has access uniformity for two or more threads of the plurality of threads. In this embodiment, the plurality of instructions also include a second instruction to perform a scalar access in place of the vector access and a third instruction to perform a cross-thread data sharing of results of the scalar access with a plurality of threads. Alternatively, the second instruction can be a vector access performed by a single thread in each group of threads having access uniformity. In other embodiments, the plurality of instructions can include other suitable types of instructions.

If the vector memory access instruction does not satisfy the one or more conditions (conditional block 715, "no" branch), then the compiler does not replace the vector memory access instruction (block 730). After blocks 725 and 730, if there are more instructions in the received sequence of instructions (conditional block 735, "yes" branch), then method 700 returns to conditional block 710. Otherwise, if there are no more instructions in the received sequence of instructions (conditional block 735, "no" branch), then the compiler converts the sequence of instructions into machine executable code (block 720). After block 720, method 700 ends.

Turning now to FIG. 8, one embodiment of a method 800 for performing run-time checking of access uniformity of vector memory access instructions is shown. A processor (e.g., GPU 130 of FIG. 1) performs a run-time check to determine if two or more threads of a wave have access uniformity to memory prior to executing a vector memory access instruction for the wave (block 805). It is noted that the term "run-time check" is defined as performing a check during execution of an application. The number of threads which are used to determine if the wave has access uniformity can vary according to the embodiment. In one embodiment, the run-time check determines if all of the threads of the wave have access uniformity. In another embodiment, the run-time check determines if half of the threads of the wave have access uniformity. In other embodiments, the run-time check can determine if other numbers of threads of the wave have access uniformity. Additionally, in some embodiments, more than one run-time check can be performed. For example, in one embodiment, a first run-time check can determine if all of the threads of the wave have access uniformity and if false, a second run-time check can determine if half of the threads of the wave have access uniformity, and so on.

If the run-time check determines that two or more threads of the wave have access uniformity (conditional block 810, "yes" branch), then the processor executes one or more replacement instructions rather than executing the vector memory access instruction (block 815). For example, if the vector memory access instruction is a store instruction, then the processor executes a scalar store to memory rather than the vector store. Alternatively, if the vector memory access instruction is a load instruction, then the processor executes a scalar load from memory followed by a cross-thread data sharing instruction rather than executing the vector load. The cross-thread data sharing instruction shares the result of the scalar load with the plurality of threads which have access uniformity. In another embodiment, the replacement instruction(s) can include a vector memory access instruction executed by a single thread of each group of threads which has access uniformity.

If the run-time check determines that two or more threads of the wave do not have access uniformity (conditional block 810, "no" branch), then the processor executes the vector memory access instruction (block 820). Alternatively, the processor can perform multiple run-time checks. If the first run-time check determines whether all threads in the wave have uniform access, then these additional run-time checks can determine if successively smaller numbers of threads of the wave have access uniformity. After blocks 815 and 820, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
    a vector unit; and
    a memory;
    wherein the system is configured to:
        perform a run-time check to determine if two or more threads of a wave access a same location in the memory prior to executing a vector memory access instruction for the wave on the vector unit; and
        replace the vector memory access instruction with one or more instructions responsive to determining that two or more threads of the wave access a same location in the memory.

2. The system as recited in claim 1, wherein the one or more instructions comprise a scalar memory access instruction followed by a cross-thread data sharing instruction.

3. The system as recited in claim 1, wherein the one or more instructions comprise a vector memory access instruction performed by a single thread in each group of threads having access uniformity.

4. The system as recited in claim 1, wherein the vector memory access instruction is a vector memory load instruction or a vector memory store instruction.

5. The system as recited in claim 1, wherein the run-time check determines if the two or more threads have a same offset to the memory, and wherein an offset to the memory is stored by each thread in a corresponding vector register.

6. The system as recited in claim 1, wherein the system is configured to perform a single run-time check to determine if multiple memory accesses have access uniformity.

7. The system as recited in claim 1, wherein the system is configured to perform the run-time check to determine if all threads of the wave access a same location in the memory prior to executing the vector memory access instruction for the wave on the vector unit.

8. A method comprising:
    performing a run-time check to determine if two or more threads of a wave access a same location in the memory prior to executing a vector memory access instruction for the wave on a vector unit; and
    replacing the vector memory access instruction with one or more instructions responsive to determining that two or more threads of the wave access a same location in the memory.

9. The method as recited in claim 8, wherein the one or more instructions comprise a scalar memory access instruction followed by a cross-thread data sharing instruction.

10. The method as recited in claim 8, wherein the one or more instructions comprise a vector memory access instruction performed by a single thread in each group of threads having access uniformity.

11. The method as recited in claim 8, wherein the vector memory access instruction is a vector memory load instruction or a vector memory store instruction.

12. The method as recited in claim 8, wherein the run-time check determines if the two or more threads have a same offset to the memory, and wherein an offset to the memory is stored by each thread in a corresponding vector register.

13. The method as recited in claim 8, further comprising performing a single run-time check to determine if multiple memory accesses have access uniformity.

14. The method as recited in claim 8, further comprising performing the run-time check to determine if all threads of the wave access a same location in the memory prior to executing the vector memory access instruction for the wave on the vector unit.

15. A compiler configured to:
    receive a sequence of instructions of program code;
    detect, in the sequence of instructions, a vector memory access instruction;
    determine if the vector memory access instruction satisfies one or more conditions; and
    replace the vector memory access instruction with a plurality of instructions responsive to determining that the vector memory access instruction satisfies the one or more conditions.

16. The compiler as recited in claim 15, wherein the plurality of instructions make the vector memory access instruction conditional on whether an access by two or more threads of a wave to a same location in memory is detected at run-time.

17. The compiler as recited in claim 15, wherein the vector memory access instruction is a vector memory load instruction or a vector memory store instruction.

18. The compiler as recited in claim 15, wherein a condition of the one or more conditions comprises determining that a probability of two or more threads of the vector memory access instruction accessing a same location is greater than a threshold.

19. The compiler as recited in claim 15, wherein a condition of the one or more conditions comprises the vector memory access instruction accessing patch constant or control point data as part of a domain shader.

20. The compiler as recited in claim 15, wherein the plurality of instructions comprise:
- one or more first instructions to determine, at run-time, if two or more threads of the vector memory access instruction access a same location in memory;
- a second instruction to perform a scalar memory access in place of the vector memory access instruction responsive to determining that two or more threads of the vector memory access instruction access a same location in memory; and
- a third instruction to perform a cross-data sharing of results of the scalar memory access with a plurality of threads.

* * * * *